United States Patent Office 3,444,892
Patented May 20, 1969

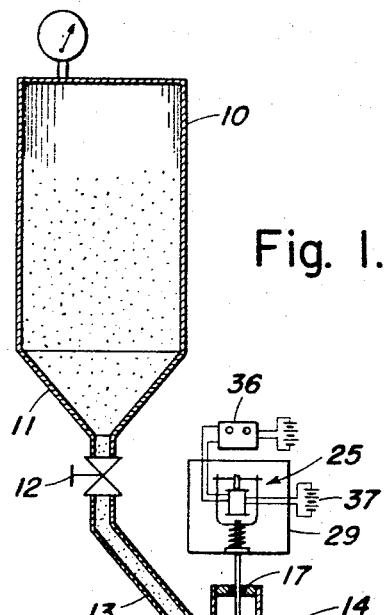
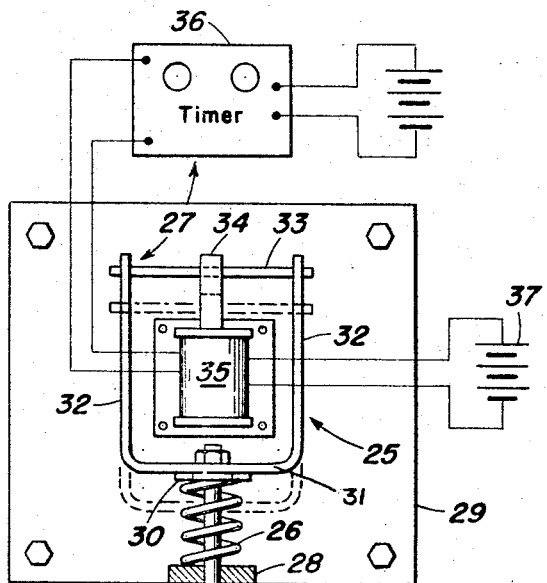
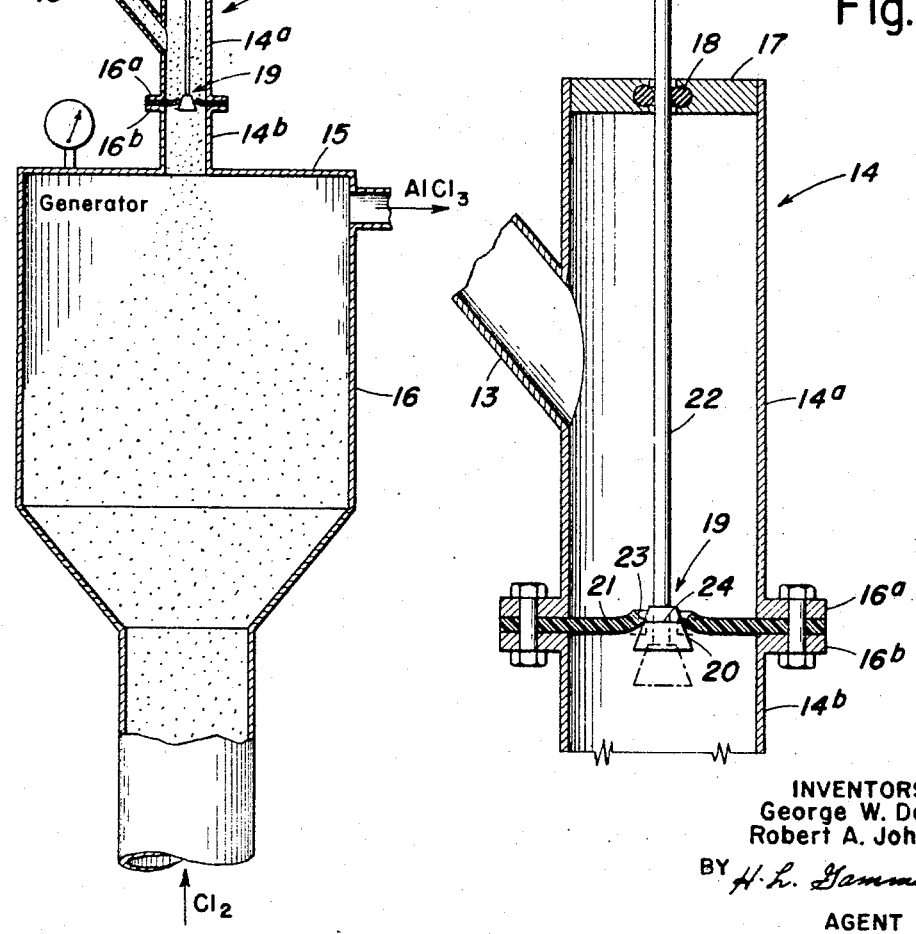

3,444,892
DISPENSING DEVICE FOR METERING THE FLOW OF PARTICULATE MATERIALS
George W. Doyle, Middletown, and Robert A. Johnson, Long Branch, N.J., assignors to National Lead Company, New York, N.Y., a corporation of New Jersey
Filed June 9, 1966, Ser. No. 556,515
Int. Cl. F16k 1/04, 1/34, 1/42
U.S. Cl. 137—624.15                              9 Claims

ABSTRACT OF THE DISCLOSURE

The present invention relates in general to a dispensing device and more especially to an improved foil-safe valve-means for metering the flow of finely divided solid materials from a supply source to a treatment zone and in particular to a pressurized system involving the same.

---

There are many instances in industry where finely divided solid materials must be fed at controlled rates through feed lines from a supply source to a treating zone where the finely divided materials are subjected to treatment usually at relatively high temperatures and quite often at superatmospheric pressures, typical of which are the feeding of powdered materials to catalytic hydrocarbon cracking systems, metal halogenating systems and the like.

A common problem in metering the flow of powdered materials in this category has been the design of a suitable valve for the feed lines which, in the first instance, is operable to meter the flow of the powdered material through the feed lines, and secondly will provide a fluid-tight seal when closed. This is particularly essential in those systems that operate at high temperatures and pressures the difficulty heretofore being that invariably some of the particles of finely divided material flowing through a valve of conventional design, such as for example, a ball-valve or gate-valve, will be caught between the valve seat and the movable valve-member. This is especially the case when feeding a relatively soft malleable metal such as powdered aluminum metal.

An object then of the present invention is to provide an improved dispensing device for metering the flow of a finely divided solid particulate material from a supply source to a treatment zone.

Another object of the present invention is to provide a dispensing device with an improved valve for metering the flow of powdered materials through a feed line.

A further object of the invention is to provide an improved fail-safe valve for use in conjunction with the halogenation of metals for metering the flow of a powdered malleable metal through a feed line under conditions of relatively high pressure and temperature.

These and other objects, features and advantages of the invention will be described more fully in the specification below and by the drawings in which:

FIG. 1 is a schematic vertical elevation of the dispensing device of this invention embodying the improved valve for metering the flow of a powdered material; and FIG. 2 is an enlarged vertical elevation partially in section of the dispensing device of FIG. 1 showing details of the fail-safe valve.

Broadly, the instant invention relates to a dispensing device having an improved valve for metering the flow of a finely divided solid particulate material through a feed line, said valve comprising a resilient valve-seat mounted in the feed line, a movable valve-member supported by a valve-stem on the underside of the resilient valve-seat and arranged to make substantially line-contact only therewith and to flex said resilient valve-seat upwardly when drawn upwardly by said valve-stem to close said valve, and valve actuating-means of fail safe design adapted normally to hold the movable valve-member in its closed position on the valve-seat, and to be actuated automatically and in timed sequence to unseat the movable valve-member and open the valve thereby metering the flow of the solid particulate material through the feed line.

It has been discovered that by providing a resilient valve-seat which will flex upwardly and by effecting substantially line-contact only between the movable valve-member and the underside of the resilient valve-seat the valve can be opened and closed in intervals of various durations and at various frequencies over extended periods of time to provide accurate metering of the flow of a solid particulate material and in particular powdered aluminum metal through a feed-line; and further, that the movable valve-member will make a fluid-tight seal with its resilient valve-seat with each closing of the valve.

While the explanation for the infallible operation of the valve, especially with a malleable metal such as powdered aluminum, is not known exactly, it has been postulated that as the valve-member moves upwardly from its open position to its closed position any solid particles that may be caught between the movable valve-member and its resilient seat are carried upwardly by the movable valve-member, and due to the flexing of the resilient valve-seat are moved out of contact therewith whereby the valve-seat is freed of any solid particulate materials thereby insuring a fluid tight seal with the movable valve-member. Moreover, such pinching of solid particles between the valve-member and the valve-seat as may occur initially during the closing of the valve is, due to the resilience of the valve-seat, insufficient to deform the particles and/or smear the surface of the valve-seat. This is especially significant when the solid particles comprise a finely divided malleable metal such as aluminum powder.

In this connection the improved valve of this invention is useful in any device for dispensing finely divided solid materials and in particular powdered materials having a particle size within the range of from —40 to +140 mesh by Standard Tyler screen analysis.

Turning now to the drawings, FIG. 1 is a schematic showing of the powder dispensing device of this invention used in conjunction with a generator in which powdered aluminum metal is reacted with gaseous chlorine to produce gaseous aluminum chloride, the entire system being pressurized. It will be understood however, that this showing is for purposes of illustration only and that the improved dispensing device of this invention may be used in any system, whether pressurized or not, for metering the flow of a particulate solid material through feed lines.

As shown in FIG. 1 the solid particulate material, in this instance, powdered aluminum is stored in a sealed hopper 10 having an outlet 11 at its bottom provided with a ball valve 12, or its equivalent, which is normally open but may be closed upon termination of a run, or in the event of a malfunction or power failure.

The outlet 11 is connected by feed-pipe 13 to a valve casing 14 which is supported in a substantially vertical position above the top 15 of the generator 16, the feed-pipe 13 being connected into the side wall of the valve casing 14 adjacent the upper end thereof at an acute angle to its longitudinal axis.

The valve casing 14 is shown as comprising two sections, an upper section 14a and a lower section 14b, each section being provided with an annular flange 16a and 16b respectively, whereby the two sections may be bolted together to form a unitary structure.

The upper section 14a of the valve casing is closed by a plug 17 having an axial aperture provided with suitable sealing means such as O-ring packing 18 for maintaining a gas tight sliding fit with a valve-stem adapted to operate the movable valve-member as hereinafter described. The upper section 14a of the valve casing is adapted to receive the powdered aluminum from the hopper via the feed-pipe 13 for delivery to the generator and hence is hereinafter referred to as the feed-chamber 14a.

The lower section 14b of the valve casing 14 connects at its bottom end into the top 15 of the generator 16 with a gas-tight seal and constitutes a feed-line for delivering the powdered aluminum metal from the feed-chamber 14a into the generator.

Interposed between the feed-chamber 14a and the feed-line 14b is the improved valve of this invention, indicated generally at 19, for metering the flow of the powdered metal to the generator. As shown especially well in FIG. 2 the valve 19 comprises a movable valve-member 20, a resilient valve-seat 21 and a valve-stem 22. The movable valve-member 20 may be formed of any suitable material but is preferably a hard corrosion resistant metal, or metal alloy, and may be of any desired configuration consistent with the objects of the invention, as for example, in the form of a ball or in the form of a truncated cone such as shown in the drawings. The valve-seat 21 comprises a resilient member formed of rubber or a synthetic plastic material such as Teflon, a polyurethane or the like having an aperture 23 extending therethrough; and may be, although not necessarily, in the form of a centrally apertured disc sufficiently thin to provide the flexibility desired as and for the purpose hereinafter described. As an apertured resilient disc the latter has an O.D. corresponding to that of the flanges 16a and 16b of the upper and lower sections of the valve casing and is adapted to be mounted there-between and secured with a gas-tight seal by suitable flange bolts.

As mentioned above the dispensing device of the instant invention is characterized by an improved valve which combines a resilient valve-seat with a movable valve-member designed to make circumferential line-contact only with the bottom rim of the valve-seat and to flex the valve-seat upwardly when the valve is closed. To this end the valve-stem 22 is mounted within the valve casing 14 with the upper reach of the valve-stem extending through the O packing ring 18 at the top of the valve casing. The lower reach of the valve-stem is adapted to extend down through the central aperture 23 of the resilient valve-seat 21 and to support the movable valve-member 20 in the feed-line 14b in a plane below the horizontal plane of the valve-seat. Moreover, as shown especially well in FIG. 2 the movable valve-member 20, whether spherical or in the form of a truncated cone, is designed so that an annular portion only of its upwardly facing surface makes contact with the underside of the valve-seat, which is to say that the diameter of an annulus 24 on the upwardly facing surface of the movable valve-member 20 is greater than the diameter of the central aperture 23 of the resilient valve-seat such that when the valve-member 20 is drawn upwardly by the valve-stem 22 into its closed position only the annulus 24 of the movable valve-member 20 contacts the bottom rim of the aperture 23 of the resilient valve-seat 21.

Further, the stroke of the valve-stem 22 is adjustable, as hereinafter described, such that upon drawing the valve-member 20 upwardly into its closed position the resilient valve-seat and in particular the rim of its central aperture 23 will be flexed upwardly.

In the particular embodiment of the invention shown and described herein the resilient valve-seat was a polyurethane disc approximately ¼ inch thick having a central aperture ⅞ inch in idameter and a resiliency of 95 durometers; and the movable valve-member was a stainless steel plug in the form of a truncated cone the top of which had an O.D. of ½ inch, and the bottom of which had an O.D. of 1½ inches.

In connection with the downward movement of the valve-stem to unseat the valve-member the valve-stem moves downwardly through the powdered material in the feed-chamber 14a and thereby imparts some degree of movement or agitation to the powder which prevents packing and/or bridging in the feed-chamber.

Turning now to the valve actuating-means this is indicated generally by numeral 25 and incorporates a fail-safe element i.e. resilient member 26 adapted normally to hold the valve-member in its closed position and to return the valve-member from its open position to its closed position in the event of a power failure or other malfunction; and a timer-controlled power-operated mechanism 27 adapted to open the valve in timed sequence against the restraining force of the resilient fail-safe member 26. As shown in FIG. 2 the resilient member 26 comprises a coil spring carried on the upper end of the valve-stem. The bottom of the coil spring is arranged to seat against a stop 28 fixed to a stationary frame member 29 while the top of the coil spring abuts against an adjustable collar 30 threaded on the upper reach of the valve-stem. The thrust of the coil spring on the collar serves normally to hold the movable valve-member 20 against the underside of the resilient valve-seat 21 in the manner hereinabove described; and by turning the collar 30 on the valve-stem the length of the stroke of the valve-stem may be adjusted to vary the size of the opening between the valve-seat and the movable valve-member when the latter is in its open position; to insure a gas-tight seal when the valve is closed and to vary the degree of flexing of the resilient valve-seat. In the embodiment shown herein the length of stroke of the valve-stem was about ½ inch.

The timer-controlled power-operated mechanism is adapted to positively unseat the valve-member 20 against the restraining force of the fail-safe coil spring 26 and in the instant embodiment of the invention is shown as comprising a solenoid-actuated yoke the base 31 of which is secured to the upper end of the valve-stem 22. The two spaced parallel arms 32—32 of the yoke are connected by a cross bar 33 to the armature 34 of a solenoid 35 fixed to the stationary frame member 29. Suitable electric circuitry is used for energizing the solenoid. Included in the electric circuitry is a timer 36 which controls the response of the power operated mechanism 27 to its power source 37 for effecting variations both in the length of time the valve is open and in the frequency with which the valve is opened thereby effectively metering the flow of powdered material from the feed-chamber to the generator.

The operation of the improved valve-means of this invention may be described briefly as follows:

Assuming the generator 16 is operating to produce aluminum chloride by reacting chlorine with powdered aluminum metal and that the pressure in the generator is from 4 to 10 p.s.i.g., the hopper 10 is charged with powdered aluminum metal having a particle size from about −40 to +140 mesh and, as mentioned above, is sealed and preferably pressurized to about one pound pressure above that in the generator. Since the ball valve 12 is open the powdered aluminum will flow into the feed chamber 14a via the feed pipe 13. Upon demand from the generator the timer 36 will be energized which, in turn, will energize the solenoid 35 causing its armature 34 to move in a direction to force the yoke and hence the valve-stem downwardly against the restraining force of the fail-safe spring 26 thereby unseating the movable valve-member 20 and opening the valve to permit the powdered aluminum to flow therethrough into the generator. At the end of a predetermined time interval selected by the timer 36 the solenoid will be deenergized whereupon the fail-safe spring 26 will immediately return the valve-member to its closed position on the valve-seat.

In one set of runs the timer 36 was set so as to energize the solenoid and hence cause the valve to open at approximately 10 second intervals and to hold the valve open for approximately 0.4 second each interval. Under these conditions the rate of feed of the aluminum powder to the generator was 7.5 lbs./hr. Other runs were made in which the length of time the valve was held open was maintained constant at 0.4 sec. but the timer was set so that the valve was opened at 4 and 7 second intervals respectively. Under these conditions the flow rate of the aluminum powder was about 15.5 lbs./hr. and 11.0 lbs./hr. respectively.

although the electrically energized solenoid and its connections to the valve-stem have been found to be a satisfactory power-operated mechanism for opening the valve the invention also contemplates the use of other timer-controlled power-operated mechanisms and in particular a pneumatically operated mechanism for opening the valve in accordance with the sequence dictated by the timer, a pneumatically operated mechanism having the advantage of being able to open the valve under more severe operating conditions, i.e. greater flow rates and greater operating pressures. Thus the term power-operated mechanism as used herein and in the claims will be understood to include hydraulically, electrically, or pneumatically operated mechanisms.

The invention thus provides a relatively inexpensive yet wholly dependable dispensing device for metering the flow of solid particulate materials through feed lines and is especially suitable for use in systems wherein a powdered aluminum metal must be fed into a generator operating at high temperatures and pressures the novel construction of the valve whereby the valve-member invariably seats on the resilient valve-seat with a gas-tight seal together with the fail-safe element which normally holds the valve closed and the timer controlled power-operated mechanism for opening the valve at predetermined intervals and holding it open for a predetermined length of time providing a unique and dependable dispensing device for metering the flow of solid particulate materials through feed lines.

The invention may be carried out in other specific ways than those herein set forth without departing from the spirit and essential characteristics of the invention, the present embodiments are therefore to be considered in all respects as illustrative and not restrictive and all changes coming within the meaning and equivalency range of the appended claims are intended to be embraced therein.

We claim:

1. In a powder dispensing device for metering the flow of a solid particulate material through a feed-line the improvement comprising in combination: a valve in said feed-line said valve comprising a resilient, disc-shaped valve-seat having an aperture extending therethrough and arranged to flex in a direction substantially perpendicular to the plane of its major axis in response to closing of said valve; a movable valve-member constructed and arranged to make line-contact only with the bottom rim of said disc-shaped resilient valve-seat to close said aperture of said disc-shaped resilient valve-seat to close said valve; a valve-stem constructed and arranged to extend through said valve-seat aperture and support said movable valve-member in said feed-line in a plane below the bottom rim of said aperture; and automatic valve actuating-means constructed and arranged normally to urge said movable valve-member against said disc-shaped valve-seat to flex said valve-seat and close said valve, and to actuate said valve-stem to move said valve-member off said valve-seat and open said valve for metering the flow of the solid particulate material through the said feed-line.

2. In a powder dispensing device according to claim 1 wherein the movable valve-member is a plug-type member having an annular portion the diameter of which is greater than the diameter of the aperture in said resilient disc-shaped valve-seat for making line-contact only with the bottom rim of said aperture.

3. In a powder dispensing device according to claim 1 wherein said resilient valve-seat comprises an apertured polyurethane disc.

4. In a powder dispensing device according to claim 1 wherein said automatic valve actuating-means comprises in combination; a resilient-member carried on the upper end of said valve-stem and arranged to urge said valve-stem upwardly normally to hold said movable valve-member in line-contact only with the bottom rim of the aperture of said resilient disc-shaped valve-seat thereby flexing said valve-seat upwardly and closing said valve, power-operated mechanism arranged to move said valve-stem downwardly against the restraining force of said resilient member to unseat said movable valve-member from said resilient valve-seat thereby opening said valve and timing means associated with said power-operated mechanism to vary the frequency and duration of the intervals said power-operated mechanism is actuated to open said valve.

5. In a powder dispensing device according to claim 4 wherein said resilient member comprises a coil spring mounted on said valve-stem.

6. In a powder dispensing device according to claim 4 wherein the power-operated mechanism comprises a solenoid actuated member arranged to move said valve-stem downwardly against the restraining force of said resilient member to open said valve.

7. A pressurized system for reacting powdered aluminum metal with chlorine gas to produce aluminum chloride comprising in combination: a pressurized feed chamber, a pressurized generator, a feed line arranged to connect said feed chamber to said generator, a fail-safe valve in said feed line constructed and arranged to meter the flow of said powdered aluminum from said pressurized feed chamber to said pressurized generator through said feed-line said valve comprising: a resilient disc-shaped valve-seat in said feed line having an aperture extending therethrough and arranged to flex in a direction substantially perpendicular to the plane of its major axis in response to closing of said valve a movable valve-member constructed and arranged to make line-contact only with the bottom rim of the aperture of said resilient disc-shaped valve-seat to close said valve; a valve-stem arranged to extend through the aperture of said valve seat and to be connected to said movable valve-member to support said movable valve-member in said feed line in a plane below the bottom rim of said aperture; and automatic valve actuating-means constructed and arranged normally to urge said movable valve-member against said disc-shaped valve-seat to flex said valve-seat and close said valve, and to actuate said valve-stem to move said valve-member off said valve seat and open said valve for metering the flow of said powdered aluminum through said feed line.

8. A pressurized system for reacting powdered aluminum metal with chlorine gas according to claim 7 wherein said automatic valve actuating-means comprises a resilient member carried on the upper end of said valve-stem and arranged to urge said valve-stem upwardly normally to hold said movable valve-member in line-contact only with the bottom rim of said aperture thereby flexing said valve-seat upwardly and closing said valve, power-operated mechanism arranged to move said valve-stem downwardly against the restraining force of said resilient member to unseat said movable valve-member thereby opening said valve and a timer associated with said power-operated mechanism and arranged to control the frequency and duration of the intervals said power-operated mechanism is actuated to open said valve.

9. A pressurized system for reacting powdered aluminum metal with chlorine gas according to claim 7 wherein the said automatic valve-actuating means includes an adjustable collar on said valve-stem arranged to adjust the stroke of said valve-stem whereby engagement of said movable valve-member with the bottom rim of the aperture in said resilient disc-shaped valve-seat normally to close said valve flexes said resilient valve-seat upwardly.

References Cited

UNITED STATES PATENTS

| | | | |
|---|---|---|---|
| 2,328,805 | 9/1943 | Holthouse | 251—333 |
| 2,738,159 | 3/1956 | Fleming | 251—333 |
| 2,895,548 | 7/1959 | Stafford | 137—624.13 X |
| 3,059,898 | 10/1962 | Carlson | 251—368 X |
| 3,101,159 | 8/1963 | Fletcher | 222—70 |
| 3,188,302 | 6/1965 | Lorenz | 251—368 X |

FOREIGN PATENTS 1,048,454  1/1959  Germany.

ALAN COHAN, *Primary Examiner.*

U.S. Cl. X.R.

222—70; 251—333, 364